(12) United States Patent
Meidell et al.

(10) Patent No.: US 7,637,423 B2
(45) Date of Patent: Dec. 29, 2009

(54) METHOD OF PROCESSING A CHECK DEPOSITING TRANSACTION BETWEEN A BANK CUSTOMER AND A BANK TELLER

(75) Inventors: Christopher Meidell, Waterloo (CA); Richard P. Lugg, Waterloo (CA)

(73) Assignee: NCR Corporation, Dayton, OH (US)

( * ) Notice: Subject to any disclaimer, the term of this patent is extended or adjusted under 35 U.S.C. 154(b) by 333 days.

(21) Appl. No.: 11/517,854

(22) Filed: Sep. 8, 2006

(65) Prior Publication Data

US 2008/0061126 A1 Mar. 13, 2008

(51) Int. Cl.
*G06Q 40/00* (2006.01)
*G07D 11/00* (2006.01)
*G07F 19/00* (2006.01)

(52) U.S. Cl. .......................................... 235/379; 705/43
(58) Field of Classification Search ................. 235/379; 705/42, 43, 64
See application file for complete search history.

(56) References Cited

U.S. PATENT DOCUMENTS

| 5,751,842 A | 5/1998 | Riach et al. |
| 2002/0116335 A1* | 8/2002 | Star .............................. 705/42 |
| 2003/0135454 A1* | 7/2003 | Keller et al. ................... 705/39 |

* cited by examiner

*Primary Examiner*—Kumiko C Koyama
(74) *Attorney, Agent, or Firm*—Michael Chan

(57) ABSTRACT

A method of providing receipts to depositors of bank checks. People often deposit a group of bank checks at once. All checks in the group are listed on a deposit slip which the person prepared. Sometimes, at the last minute, a person removes a check from the group, and does not deposit the removed check. However, if the person misplaces that removed check, the person can develop the false memory that he actually deposited the check, when, in fact, he did not. This false memory can lead to a dispute with the bank. In one form of the invention, the bank creates a deposit slip which contains a picture of each check which was deposited, and also a picture of each check which was removed from the deposit process. This deposit slip creates a historical record of events occurring at the deposit event, and allows one to trace all checks involved.

10 Claims, 4 Drawing Sheets

50

ABC BANK

ACCOUNT NAME: JOHN DOE
ACCOUNT NO: 098765
TRANSACTION DATE: JULY 1, 2006
TRANSACTION AMOUNT: $191.34 DEPOSIT
NUMBER OF ITEMS DEPOSITED: TWO
TELLER ID: XYZ

ITEMS DEPOSITED:

ORIGINAL DEPOSIT SLIP:

ABC BANK

ACCOUNT NAME:           JOHN DOE
ACCOUNT NO:             098765
TRANSACTION DATE:       JULY 1, 2006
TRANSACTION AMOUNT:     $123.45 DEPOSIT
NUMBER OF ITEMS DEPOSITED: ONE
TELLER ID:              XYZ

ITEMS DEPOSITED:

ITEMS RETURNED TO CUSTOMER:

ORIGINAL DEPOSIT SLIP:

MODIFIED DEPOSIT SLIP:

METHOD OF PROCESSING A CHECK DEPOSITING TRANSACTION BETWEEN A BANK CUSTOMER AND A BANK TELLER

BACKGROUND

The present invention relates to check depositing transactions, and is particularly directed to a method of processing a check depositing transaction between a bank customer and a bank teller.

In a typical check depositing transaction between a bank customer and a bank teller, the bank customer presents the bank teller with a group of checks to be deposited. The bank customer also presents the bank teller with a deposit slip which lists the checks to be deposited. When the bank teller receives the group of checks to be deposited, the bank teller scans each check to capture an image of each check. The bank teller also scans the deposit slip to capture an image of the deposit slip. The captured check images are then transmitted to a back office facility of the bank for further processing.

During the check depositing transaction, an event may occur which would result in a mismatch of the checks presented for deposit and the checks listed in the deposit slip. For example, one of the checks presented for deposit may have been removed from the group of checks to be deposited, but was not removed from the listing in the deposit slip. The check may have been removed for any number of reasons. For example, the check may have been removed because the check required a hold period and the bank customer decided to take it back. As another example, the check may have been removed because the check is from a foreign country and needs to be handled via a paper process instead of an imaging process.

When a mismatch condition occurs between checks presented for deposit and checks listed in the deposit slip, the possibility exists that the bank customer and the bank could have a dispute over whether a particular check in question was actually deposited. It would be desirable to provide a method of processing the check depositing transaction so that the potential for a dispute situation to arise between the bank customer and the bank is eliminated or at least minimized.

SUMMARY

In accordance with an embodiment of the present invention, a method is provided of a bank processing a check depositing transaction between a bank customer and the bank. The method comprises receiving from the bank customer at least one check for depositing, capturing an image of the at least one check received from the bank customer, providing the bank customer with a transaction receipt which contains (i) transaction-specific information, and (ii) an image of at least a portion of each deposited check to provide the bank customer with a record of the check depositing transaction, and storing in a storage unit a data file which is representative of an image of the transaction receipt provided to the bank customer to provide the bank with a record of the check depositing transaction.

DETAILED DESCRIPTION

Figure 1:
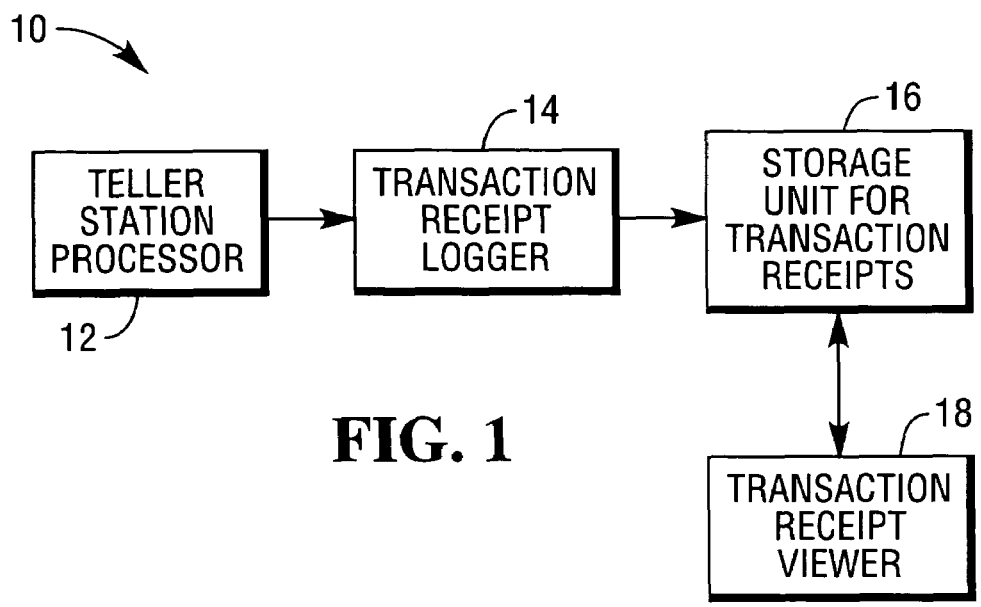
FIG. 1 is a block diagram representation of a transaction system in accordance with an embodiment of the present invention.

The present invention is directed to a method of processing a check depositing transaction between a bank customer and a bank teller. Referring to FIG. 1, a transaction system 10 in accordance with one embodiment of the present invention is illustrated in FIG. 1. The system 10 comprises a teller station processor 12 located at a bank teller station. The structure and operation of the teller station processor 12 are well known and, therefore, will not be described. The system 10 further comprises a transaction receipt logger 14, an image data storage unit 16 for transaction receipts, and a transaction receipt viewer 18, all of which will be described later.

Figure 2:
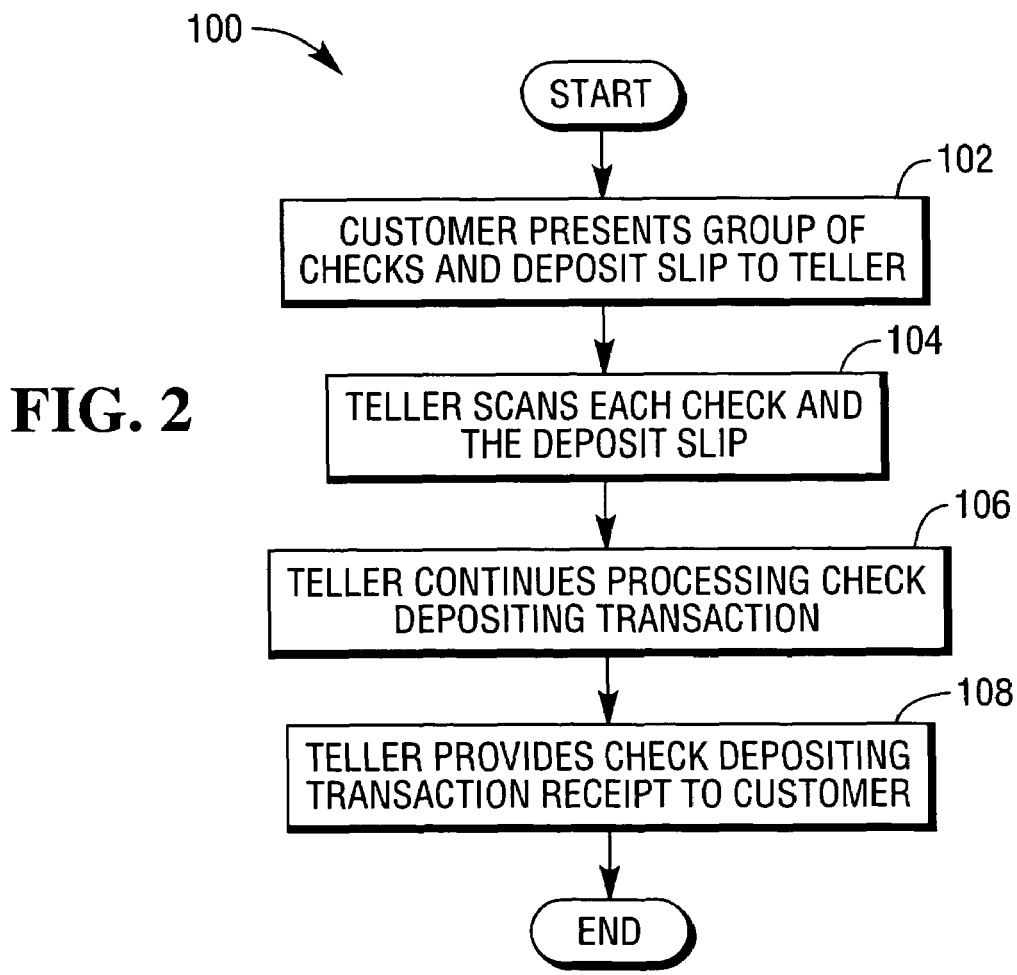
FIG. 2 is a flowchart illustrating steps involved in a check depositing transaction between a customer and a teller of a bank.

Referring to FIG. 2, a flowchart 100 depicts steps of a check depositing transaction between a bank customer and a bank teller. During the check depositing transaction, the bank customer presents a group of checks to the bank teller for deposit into the bank customer's account (step 102). The bank customer also presents a deposit slip which lists the checks to be deposited. Alternatively, the bank teller may fill out a deposit slip which lists the checks to be deposited. The group of checks can be any number of checks. By way of example, a group of two checks will be assumed to be presented by the bank customer for deposit.

When the bank teller receives the two checks from the bank customer, the bank teller scans each check to capture a grayscale image of each check (step 104). The bank teller also scans the deposit slip to capture a grayscale image of the deposit slip. Scanners for capturing item images at a bank teller station co-operate with the teller station processor 12 (FIG. 1), and are conventional and, therefore, will not be described. The captured item images are transmitted to a back office facility of the bank for further processing.

The bank teller continues to process the check deposit transaction by using the facilities of the teller station processor 12 (step 106). The processor 12 prepares a transaction receipt to be provided to the bank customer by the bank teller (step 108). An example transaction receipt is shown in FIG. 3, and is identified with reference numeral 50.

Figure 3:
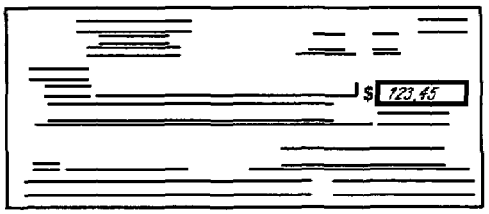
FIG. 3 is an illustration of a transaction receipt which is provided to the customer in the check depositing transaction of FIG. 2.
Figure 3:
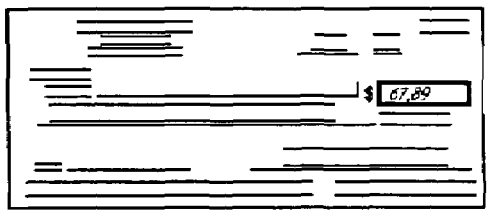
Figure 3:
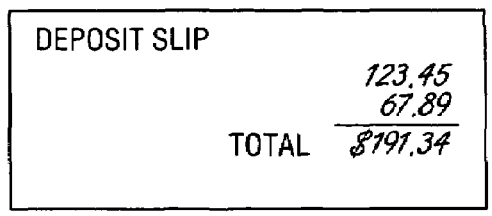

The transaction receipt 50 shown in FIG. 3 includes transaction information specific to this check depositing transaction. Transaction information specific to this check depositing transaction includes the name on the account to which the deposits have been made, the number of the account to which the deposits have been made, the transaction date on which the deposits have been made, the amount of the transaction, the type of transaction (a deposit transaction in this case), the number of items deposited (two in this case), and the identification number of the bank teller handling the transaction.

The transaction receipt 50 also includes an image of each of the two checks which have been presented by the bank customer for deposit, scanned in by the bank teller, and deposited into the account. These images are shown under the category heading "ITEMS DEPOSITED". The transaction receipt 50 further includes an image of the original deposit slip which has been scanned by the bank teller. This image is shown under the category heading "ORIGINAL DEPOSIT SLIP". After the transaction receipt 50 has been prepared, the transaction receipt is printed and provided to the bank customer.

Figure 4:
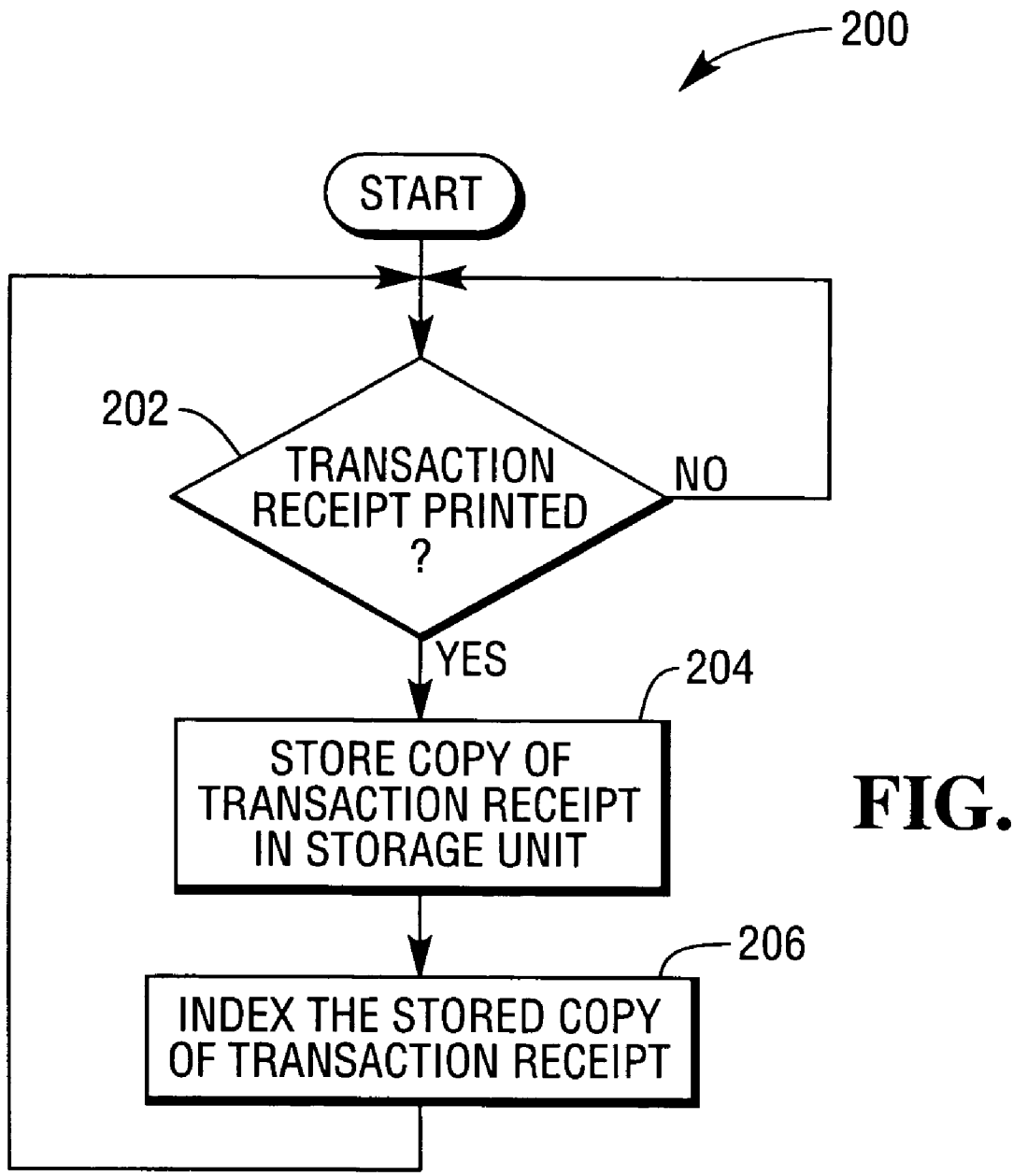
FIG. 4 is a flowchart illustrating steps involved in logging of the transaction receipt of FIG. 3.

Referring to FIG. 4, a flowchart 200 depicts steps involved in logging of the transaction receipt 50 of FIG. 3 by the transaction receipt logger 14 shown in FIG. 1. The logger 14 is a processor which monitors signals from the teller station processor 12. More specifically, the logger 14 monitors the teller station processor 12 for an occurrence of a transaction receipt being printed (step 202). Upon detection of a signal indicative of a transaction receipt being printed by teller station processor 12, the logger 14 is triggered to store a data file which is representative of a copy of the transaction receipt in the storage unit 16 (step 204). The copy of the transaction receipt stored in the storage unit 16 is substantially the same as the copy of the transaction receipt which was provided to the bank customer.

After the transaction receipt is stored in the storage unit 16, the stored transaction receipt is indexed (step 206). The stored transaction receipt is indexed so that this stored transaction receipt can be located when a query is made on the storage unit 16 via the transaction receipt viewer 18 (FIG. 1). Such a query may be made by bank personnel, for example, who need to have the details of the particular check depositing transaction.

It should be noted that the check depositing transaction which resulted in the transaction receipt 50 of FIG. 3 was a transaction in which no modifications were made during the transaction. In the transaction receipt 50 of FIG. 3, the amounts of the checks presented by the bank customer match the amounts of the checks as listed on the deposit slip.

An example of a check depositing transaction in which a modification has been made during the transaction is one in which one of the checks originally intended for deposit has been returned to the bank customer and not deposited. For example, assume that the bank customer decided during the transaction to take back the one check that is in the amount of $67.89 and not deposit this check. Given this assumption, the bank teller would have returned this particular check to the bank customer, and may have modified the deposit slip by crossing out this item on the deposit slip. This modified transaction would result in a "modified" transaction receipt 60 such as shown in FIG. 5.

Figure 5:
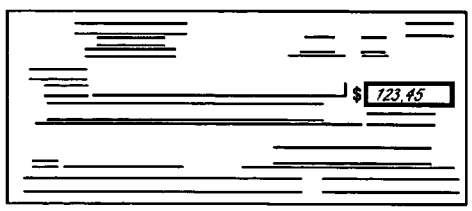
FIG. 5 is an illustration similar to the illustration shown in FIG. 3.
Figure 5:
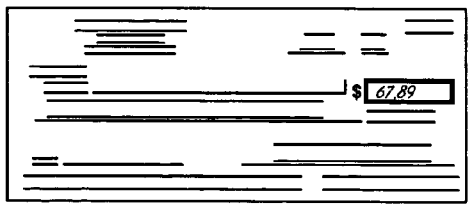
Figure 5:
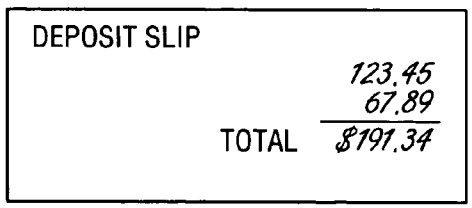
Figure 5:
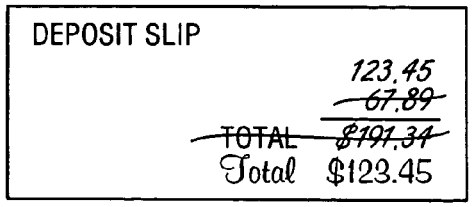

The transaction receipt 60 FIG. 5 includes transaction information similar to the transaction receipt 50 of FIG. 3. In the transaction receipt 60 of FIG. 5, all of the transaction information is the same except for (i) the transaction amount which is now $123.45 instead of $191.34 since the check in the amount of $67.89 has been removed from the transaction, and (ii) the number of items deposited which is now "one" instead of "two". The transaction receipt 60 of FIG. 5 includes an image of the check which was deposited (i.e., the check in the amount of $123.45), and is shown under the category heading "ITEMS DEPOSITED". The transaction receipt 60 also includes an image of the check which was removed during the transaction (i.e., the check in the amount of $67.89), and is shown under the category heading "ITEMS RETURNED TO CUSTOMER". The transaction receipt 60 further includes an image of the original deposit slip which was scanned by the bank teller, and is shown under the category heading "ORIGINAL DEPOSIT SLIP". The transaction receipt 60 further includes an image of the original deposit slip which was modified by the bank teller and subsequently scanned by the bank teller, and is shown under the category heading "MODIFIED DEPOSIT SLIP".

Although the above-description describes the logger 14 initiating the step of storing a copy of a transaction receipt in the storage unit 16 in response to a trigger signal indicative of the transaction receipt being printed, it is conceivable that the logger initiate this step in another way.

Further, although the above-description describes specific category headings under which item images are provided on a transaction receipt, it is conceivable that different category headings may be provided. Different category headings may include (i) whether an item image is an "on-us" item, (ii) whether an item image is a "not on-us" item, (iii) whether an item image has been rejected by the bank as being of insufficient image quality, (iv) whether an item image is a duplicate item, (v) whether an item image is "not image clearable" such as a foreign check, and (vi) whether an item image is a modified item. These different category headings are just examples. It is conceivable that a transaction receipt may include any combination of these different category headings, those category headings shown in the transaction receipt 60 of FIG. 5, and other category headings not mentioned herein. The category headings shown in the transaction receipt 50 of FIG. 3 and the transaction receipt 60 of FIG. 5 are shown by way of example only.

Also, although the above-description describes a check deposit transaction in which a deposit slip is used, it is conceivable that a check deposit transaction be made without a deposit slip. In this case, there would be no images of a deposit slip or a modified deposit slip.

Also, although the above-description describes the scanners at the bank teller station providing grayscale images of items which have been scanned, it is conceivable that the scanners provide other types of images, such as color images or binary images (i.e., black and white images).

It should be apparent that the transaction system 10 of FIG. 1 provides assistance in managing and recording changes which have been made to a check depositing transaction, especially for changes to a deposit slip. Since the bank has access to copies of the transaction receipts, a dispute which may arise between a bank customer and the bank should be able to be resolved relatively quickly. Moreover, the potential for fraud by a bank customer forging a transaction receipt is reduced.

In addition, by providing the transaction system 10 of FIG. 1, it would be possible to provide bank customers with the capability to retrieve transaction receipts on demand. This service to bank customers has the potential to increase customer satisfaction.

The particular arrangements disclosed are meant to be illustrative only and not limiting as to the scope of the invention. From the above description, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of processing a check deposit at a bank, comprising:
   a) receiving from a bank customer one or more checks and a deposit slip;
   b) capturing an image of each of the received checks and a first image of the deposit slip;
   c) electronically on a processor generating a transaction receipt which contains
      (i) an image of at least a portion of at least one check which was not deposited, and
      (ii) a second image of the deposit slip which contains modifications based upon the at least one check which was not deposited; and
   d) delivering the receipt to the customer.

2. A method according to claim 1, wherein the transaction receipt further contains an image of at least a portion of each deposited check to provide the bank customer with a record of the check depositing transaction.

3. A method according to claim 2, wherein the transaction receipt further contains the first image of the deposit slip.

4. A method according to claim 1, wherein the transaction receipt further contains the first image of the deposit slip.

5. A transaction system comprising:
 a) a scanner for
  (i) capturing images of checks, and
  (ii) capturing images of deposit slips;
 b) a teller station processor for processing checks, and providing a transaction receipt which contains
  (i) images of deposited checks and non-deposited checks,
  (ii) indicators which designate images of checks which were not deposited, but returned to a customer,
  (iii) indicators which designate images of checks which were deposited, and
  (iv) an image of a deposit slip;
 wherein the receipt also contains a second image of said deposit slip, which contains modifications of said deposit slip.

6. A transaction system according to claim 5, in which the transaction receipt contains a full image of each deposited check.

7. A transaction system according to claim 5, in which the transaction receipt contains a full image of the deposit slip.

8. A transaction system according to claim 5, in which the transaction receipt contains a full image of each deposited check and a full image of the deposit slip.

9. A transaction system according to claim 8, in which
 (i) the image of each deposited check is located within a first category heading on the transaction receipt, and
 (ii) the image of the deposit slip is located within a second category heading which is different from the first category heading on the transaction receipt.

10. A method of processing bank checks received from a bank customer for deposit, comprising:
 a) receiving an original deposit slip from the customer which lists
  i) a first check stating a first amount and
  ii) a second check stating a second amount and which states a total amount, which is a sum of the first and second amounts;
 b) creating a modified deposit slip;
 c) accepting the first check for deposit;
 d) not accepting the second check for deposit, but returning the second check to the customer;
 e) electronically on a processor generating a paper receipt which contains
  i) an image of the original deposit slip,
  ii) an image of the modified deposit slip,
  iii) images of both the first and second checks,
  iv) indications of which check was deposited and which check was not deposited, and
  v) an indication of the actual total deposit, which is different from said total amount; and
 f) delivering the receipt to the customer.

\* \* \* \* \*